United States Patent
Mayle

(10) Patent No.: US 10,063,617 B2
(45) Date of Patent: Aug. 28, 2018

(54) ERROR CORRECTION USING STATE INFORMATION OF DATA

(71) Applicant: Facebook, Inc., Menlo Park, CA (US)

(72) Inventor: Douglas Michael Mayle, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 260 days.

(21) Appl. No.: 14/861,913

(22) Filed: Sep. 22, 2015

(65) Prior Publication Data

US 2017/0085679 A1  Mar. 23, 2017

(51) Int. Cl.
*G06F 17/30* (2006.01)
*H04L 29/08* (2006.01)
*G06F 11/00* (2006.01)
*H04L 29/14* (2006.01)

(52) U.S. Cl.
CPC .............. *H04L 67/02* (2013.01); *G06F 11/00* (2013.01); *G06F 17/30* (2013.01); *G06F 17/30575* (2013.01); *H04L 67/1095* (2013.01); *H04L 67/2828* (2013.01); *H04L 69/40* (2013.01); *G06F 17/30581* (2013.01)

(58) Field of Classification Search
CPC ...................... G06F 17/30575; G06F 17/30581
See application file for complete search history.

(56) References Cited

U.S. PATENT DOCUMENTS

| | | | |
|---|---|---|---|
| 2003/0005161 A1* | 1/2003 | Chen ................. | G06F 17/30575 709/248 |
| 2003/0005342 A1* | 1/2003 | Thomas ............ | G06F 17/30581 713/400 |
| 2010/0056187 A1* | 3/2010 | Abuelsaad .............. | H04L 51/24 455/466 |
| 2010/0165846 A1* | 7/2010 | Yamaguchi ........ | H04B 7/15592 370/236 |
| 2014/0337405 A1* | 11/2014 | Athas ...................... | H04L 67/26 709/203 |
| 2015/0032889 A1* | 1/2015 | Chan ................... | H04L 67/1095 709/224 |

* cited by examiner

*Primary Examiner* — Jeong S Park
(74) *Attorney, Agent, or Firm* — FisherBroyles, LLP

(57) ABSTRACT

The disclosure is directed to error correction in transmission of data whose state is to be synchronized between a server and a client. When data, e.g., a web page, changes at the server, the changes are sent to the client as a sequence of diffs, where each diff represents an incremental change in the state of the data over a previous diff in the sequence. This can eliminate the need to transmit the whole webpage whenever the web page changes. If a diff is lost in transmission, the state of the webpage at the client becomes invalid. To overcome this problem, the server sends a hash of the webpage state at the server to the client, e.g., at specified intervals. The client or server can compute a hash of the webpage state and compare both the hashes. If they don't match, the client receives the whole webpage.

15 Claims, 6 Drawing Sheets

ERROR CORRECTION USING STATE INFORMATION OF DATA

BACKGROUND

Various client-server applications can exchange large amount of data. To reduce demands on data communications networks, various data compression techniques, e.g., run-length encoding, zip archive, etc., may be employed. However, some data may not be suitable for traditional compression techniques. Alternatively, because data compression and decompression can be compute intensive or can take considerable time, their use is unsuitable for some applications. As an example, a social network may regularly transmit user interface information (e.g., data or even executable code) from a server computing device ("server") to a client computing device ("client"). Sometimes this data is infrequently updated. Alternatively, only small portions of this data may be updated. In these cases, a superior data compression and transmission process than traditional data compression techniques is desirable.

DETAILED DESCRIPTION

Figure 1:
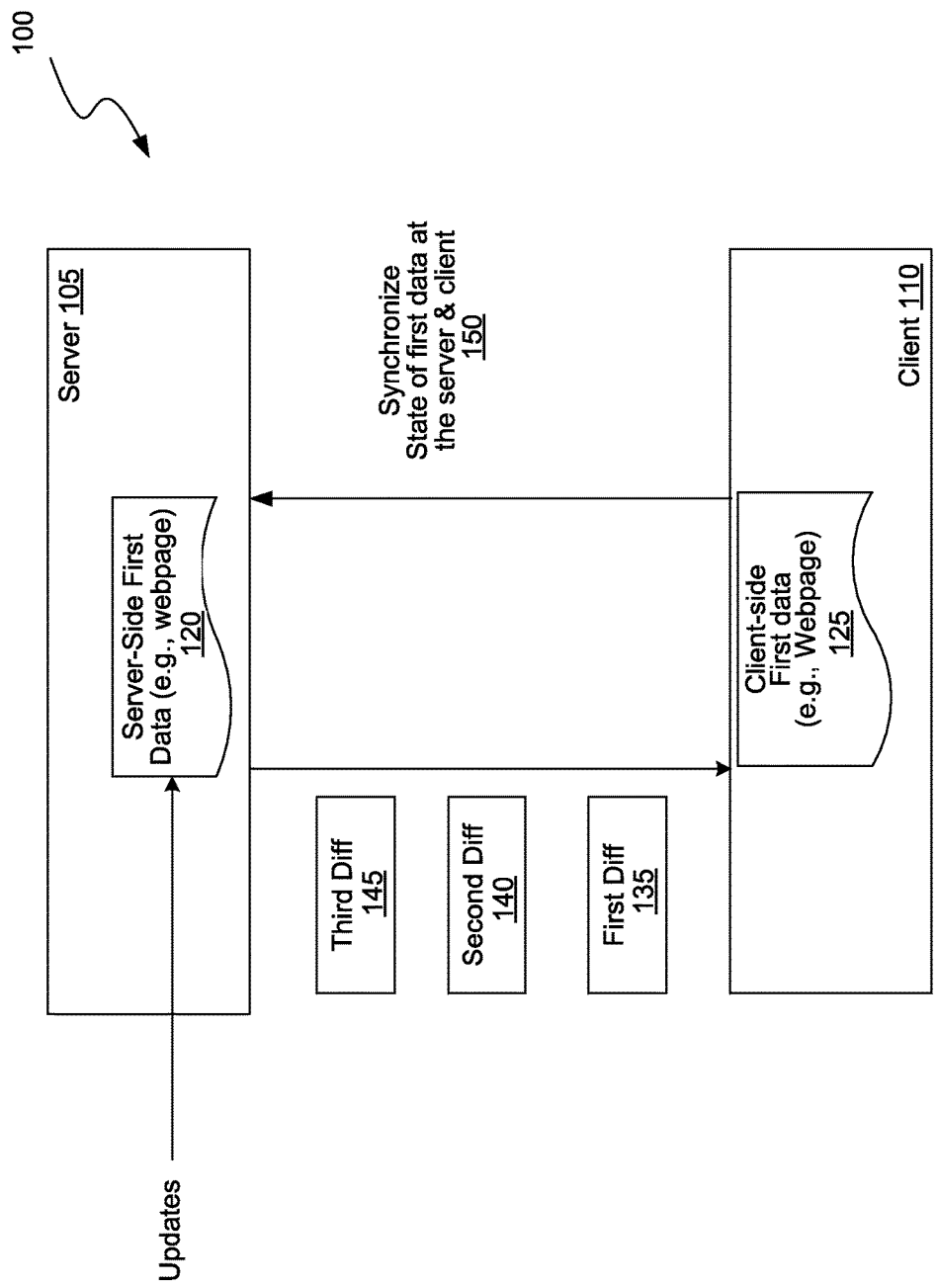
FIG. 1 is a block diagram of an environment in which the disclosed embodiments can be implemented.

A process for reducing communicated data is to transmit a full set of data ("key") and thereafter only send updates to the data ("diff"). However, if a data communication occurs, a subsequent diff may include insufficient information to re-construct all data. Embodiments are disclosed for error correction in transmitting data whose state is to be synchronized between two entities, e.g., a server computer ("server") and a client computer ("client"). The embodiments use a diffing engine to optimize transmitting data over a communication network. In some embodiments, a diffing engine enables sending data, e.g., for rendering a web page, as a sequence of differences ("diffs"), in which each difference ("diff") represents an incremental change in the data over the state conveyed by a previous diff by the sequence. This method of data transmission can be optimal for generating webpages that change frequently. Thus, the need for transmitting the whole webpage every time there is a change in the web page can be eliminated. However, the drawback in such a method can be that when there is a loss in one or more diffs, e.g., due to a transmission error, the data at the client becomes invalid and the webpage may not be capable of being generated using just a new diff. A user using the client may then have to the request the complete webpage, e.g., by refreshing the browser on the client.

The disclosed embodiments can solve this problem by causing the server to automatically send the whole webpage to the client in case of any errors with respect to the diffs, e.g., that are caused during data transmission. The disclosed embodiments provide a mechanism to determine whether or not to send a complete webpage to the client based on a state of the web page at the client and at the server at a specified instance. In some embodiments, a state of webpage is determined as a function of data contained in the webpage at a specified instance. If the data in the webpage changes, the state can also change. If the states of the web page at the server and the client do not match, e.g., due to loss of one or more diffs during transmission to the client, the server can automatically send the complete webpage to the client without the user having to request the webpage manually.

In some embodiments, the server sends a state information of the web page, e.g., as a hash value that is computed based on the state of the webpage at a specified time ("server-computed hash"), to the client. The client also determines the state information of the webpage, e.g., computes a hash value based on the state of the webpage at the client ("client-computed hash"), e.g., upon receipt of the server-provided hash, and compares the client-computed hash with the server-computed hash. If both the hashes match, then the webpage at the client is valid, e.g., all the diffs sent to the client until the specified time has been applied to the webpage. On the other hand, if the hashes don't match, the webpage at the client is invalid, e.g., one or more diffs sent by the server may not be capable of being applied to the webpage at the client. In response to the states not matching, the client sends an error notification to the server. The server sends the complete webpage, e.g., the webpage in its current state (state of the web page at an instance the error notification is received at the server), in response to the error notification, thereby eliminating the need for the user to refresh the browser.

In various embodiments, the server can send the hash to the client at arbitrary intervals or at a specified frequency. For example, the server can send a hash once every specified number of diffs. The specified frequency can also be determined as a function of at least one of a specified schedule, availability of network bandwidth between the server and the client, or an error rate at the client. The error rate can be a rate at which the error, e.g., states not matching, loss of one or more diffs at the client, occurs at the client.

In some embodiments, the client can send the client-computed hash to the server, and the server can compare both the hashes and send the complete webpage if the hashes do not match. The client can send the client-computed hash in addition to or alternative to the server sending the server-computed hash to the client. Further, the client can send the client-computed hash at arbitrary intervals or at specified intervals, e.g., once for every specified number of diffs received. In some embodiments, the specified intervals for the client sending the client-computed hash can be determined as a function of a specified schedule, an availability of network bandwidth between the server and the client, an error rate at the client, computing resource availability at the client, etc.

Although the disclosed embodiments may represent the state information based on a hash value, the representation of the state information is not limited to the hash value; one having ordinary skill in the art of computer science or data communication will recognize that other techniques can represent the state information.

Although the disclosed embodiments are described in association with a webpage, the disclosed embodiments are not limited to transmission of webpage data. The disclosed embodiments can be used in transmitting data related to other applications, e.g., in which the data is to be synchronized between the two entities. For example, the disclosed embodiments can be used in chat-message based applications for transmitting as diffs messages of a conversation between two or more users. As the conversation progresses between two users, an increasing number of messages are exchanged and the conversation at their respective clients may have to be updated continuously. These changes to the messages can be sent as diffs to the clients.

Turning now to the figures, FIG. 1 is a block diagram of an environment 100 in which the disclosed embodiments can be implemented. The environment 100 includes a server 105 which has a server-side data 120, e.g., a webpage, that is to be transmitted to a client 110. The server 105 transmits the server-side webpage 120 to the client 110 and the client 110 hosts it as client-side data 125, e.g., renders it as a client-side webpage 125. A user associated with the client 110 can access the client-side webpage 125 using a web browser application or an app, which is capable of rendering the client-side webpage 125, installed at the client 110. The client 110 can be any of various types of computing devices, e.g., a desktop PC, a laptop, a smartphone, a tablet PC, or a wearable device. The client 110 can host one or more operating systems, e.g., Microsoft Windows, Mac OS, iOS, or Android.

Initially, e.g., when the server 105 is sending the server-side webpage 120 to the client 110 for the first time, the server 105 sends the complete server-side webpage 120 to the client 110. The server-side webpage 120 can change over time, e.g., based on updates received from one or more sources (not illustrated). After updating the server-side webpage 120, the server 105 transmits such changes to the client 110 for updating the client-side webpage 125. In some embodiments, the server 105 updates the client-side webpage 125 by sending diffs, e.g., incremental updates, rather than the sending the complete server-side webpage 120. For example, when the server 105 receives a first change to the server-side webpage 120, e.g., from a specified source (not illustrated), the server 105 updates the server-side webpage 120 based on the first change to generate an updated server-side webpage. The server 105 then sends the first change to the client 110 as a first diff 135, which is determined as a difference between the state of the server-side webpage 120 prior to and after changing. The client 110 updates the client-side webpage 125 by applying the first diff 135 to the client-side webpage 125. Accordingly, by sending a diff instead of a complete webpage, the consumption of bandwidth of a communication network between the server 105 and the client 110 is minimized.

Similarly, subsequent changes to the server-side webpage 120, e.g., based on a second change and a third change, are sent to the client 110 as a second diff 140 and a third diff 145 respectively. The second diff 140 corresponds to an incremental change to the server-side webpage 120 made over the first change, and the third diff 145 includes an incremental change to the server-side webpage 120 made over the second change. The client 110 updates the client-side webpage 125 by applying the second diff 140 and the third diff 145. In some embodiments, the client 110 can receive multiple diffs simultaneously. The client 110 can identify the sequence of the diffs by analyzing the diffs, e.g., by identifying a sequence number.

In some embodiments, the states of the server-side webpage 120 and the client-side webpage 125 are checked by either the client or the server to ensure that the client-side webpage 125 is valid, e.g., contains the same data as the server-side webpage 120. If the states do not match, then the client-side webpage 125 can be invalid. The client-side webpage 124 can be invalid due to various reasons, e.g., one or more diffs are missing at the client 110, one or more diffs sent by the server 105 did not reach the client 110, one or more diffs are lost in transmission, or one or more diffs sent by the server 105 become corrupted. When the states do not match, the server 105 sends a complete server-side webpage 120 to the client 110. After the client 110 receives the complete server-side webpage 120, the states of the web pages at the server 105 and the client 110 are synchronized (150) and both devices have the webpages in the same state. Additional details with respect to determining the states are described at least in association with FIGS. 2 and 3 below.

The diffs, e.g., the first diff 135, the second diff 140 and the third diff 145, can be generated using a diffing engine. The disclosed embodiments can use known diffing engines to generate the diffs. The diffing engine can be implemented as a stand-alone computer, in the server 105, and/or the client 110, or can be distributed over various entities in the environment 100.

Figure 2A:
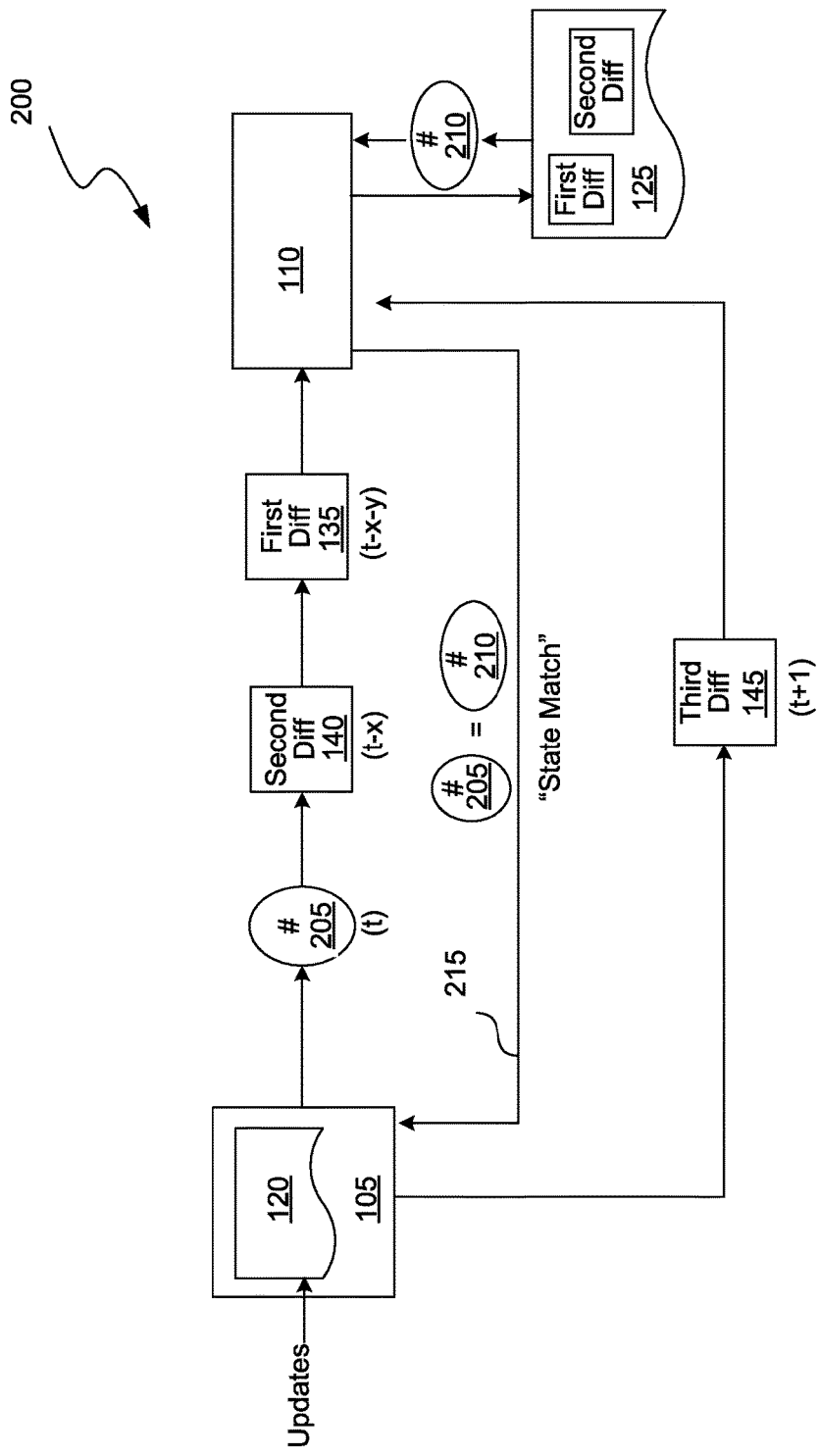
FIG. 2A is a block diagram of a first example of the disclosed embodiments in which states of webpages at a server and a client of FIG. 1 match, consistent with various embodiments.

FIG. 2A is a block diagram of a first example 200 of the disclosed embodiments in which the states of the webpages at the server and the client of FIG. 1 match, consistent with various embodiments. In some embodiments, the first example 200 can be implemented in the environment 100 of FIG. 1. In the first example 200, the server 105 transmits the diffs to the client 110 as and when the changes to the server-side webpage 120 occur at the server 105. The server 105 also sends a state of the server-side webpage 120, e.g., computed as a hash value 205 (also referred to as "server-computed hash 205"), at arbitrary or specified intervals. The server 105 can use known hashing methods to compute the hash value 205. In the first example 200, the server 105 sends the server-computed hash 205, e.g., after the first diff 135 and the second diff 140.

The server 105 sends the server-computed hash 205 at time (t), after transmitting the second diff 140 at time (t-x) and the first diff 135 at time (t-x-y). In the illustrated example, the client 110 applied the first diff 135 and the second diff 140 successfully to the client-side webpage 125. Upon receiving the server-computed hash 205, the client 110 determines the state of the client-side webpage 125, e.g., computed as a hash value 210 (also referred to as "client-computed hash 210"), which is the state of the client-side webpage 125 at the time of receipt of the server-computed hash 205. In some embodiments, the client 110 computes the hash value 210 using known hashing methods. Further, the server-computed hash 205 and the client-computed hash 210 can be determined using the same hashing method.

The client 110 compares the server-computed hash 205 and the client-computed hash 210 to determine whether or not they match. In the first example 200, the server-computed hash 205 and the client-computed hash 210 match, which indicates that the state of the server-side webpage 120, e.g., as determined at time (t), and the state of the client-side webpage 125, e.g., as determined upon receipt of the server-computed hash 205, are the same. The client 110 sends an indication 215 to the server 105 indicating the states of the server-side webpage 120 and the client-side webpage 125 are the same, and therefore the client-side webpage 125 has valid data. The server 105 sends any subsequent changes to the server-side webpage 120, e.g., occurring after time (t), as a corresponding diff, e.g., the third diff 145, to the client 110.

Although the above embodiments describe the server 105 sending the server-computed hash 205 to the client 110 for comparison at the client 110, in some embodiments, the client 110 can send the client-computed hash 210 to the server 105 for comparison at the server 105. The client 110 can send the client-computed hash 210 in addition to or alternative to the server 105 sending the server-computed hash 205. Further, the client 110 can send the client-computed hash at arbitrary or specified intervals.

Figure 2B:
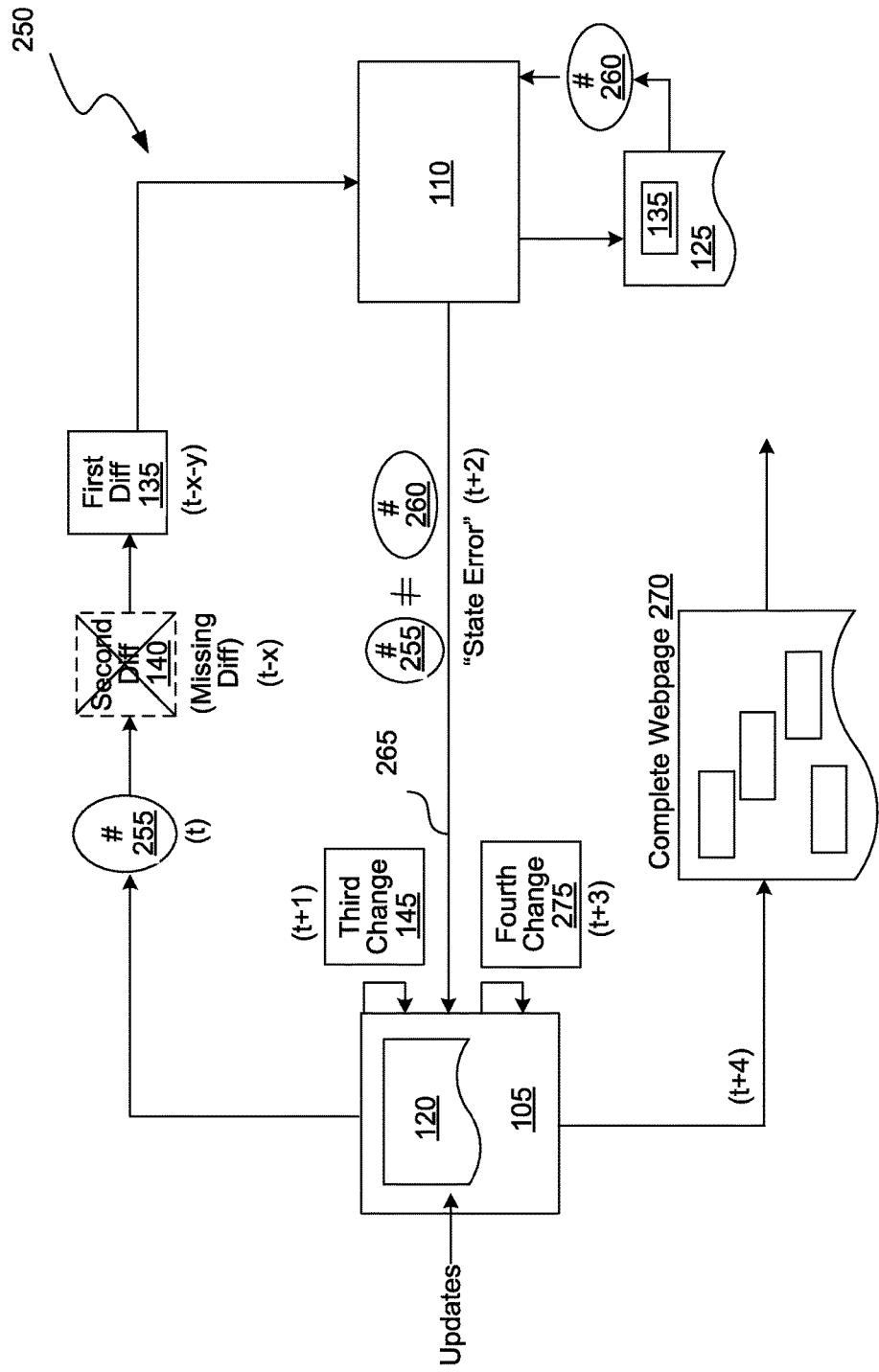
FIG. 2B is a block diagram of a second example of the disclosed embodiments in which the states of the webpages at the server and the client of FIG. 1 do not match, consistent with various embodiments.

FIG. 2B is a block diagram of a second example 250 of the disclosed embodiments in which the states of the webpages at the server and the client of FIG. 1 do not match, consistent with various embodiments. In some embodiments, the second example 250 can be implemented in the environment 100 of FIG. 1. In the second example 250, like described with reference to FIG. 2A, the server 105 transmits a state of the server 105, e.g., computed as a hash value 255 (also referred to as "server-computed hash 255"), at arbitrary or specified intervals. In the second example 250, the server 105 sends the server-computed hash 255 after multiple diffs, e.g., the first diff 135 and the second diff 140.

The server 105 sends the server-computed hash 255 at time (t), after transmitting the second diff 140 at time (t-x) and the first diff 135 at time (t-x-y). The client 110 applied the first diff 135 successfully to the client-side webpage 125. However, the second diff 140 was not applied to the client-side webpage 125 due to any of various reasons, e.g., the second diff 140 was lost in transmission or was corrupted.

Upon receiving the server-computed hash 255, the client 110 determines the state of the client-side webpage 125, e.g., computed as a hash value 260 (also referred to as "client-computed hash 260"), which is the state of the client-side webpage 125 at the time of receipt of the server-computed hash 255. The client 110 compares the server-computed hash 255 and the client computed hash 260 to determine whether or not they match. The client 110 determines that the server-computed hash 255 and the client computed hash 260 do not match, e.g., because the second diff was not applied to the client-side webpage 125. This indicates that the state of the server-side webpage 120, e.g., as determined at time (t), and the state of the client-side webpage 125, e.g., as determined upon receipt of the server-computed hash 255, are not the same. The client 110 sends an error indication 265 to the server 105 indicating the states of the server-side webpage 120 and the client-side webpage 125 are not the same, and therefore the client-side webpage 125 is invalid. Upon receiving the error indication 265, the server 105 sends the server-side webpage 120 in its current state as a webpage 270 to the client 110. The current state can be the state of the server-side webpage 120 determined just prior to sending the webpage 270 at time (t+4). The client 110 then renders the received webpage 270. The states of the webpages at the server 105 and the client 110 are then synchronized.

If the server 105 received any changes after sending the server-computed hash 255, the server 105 includes those changes as well in the webpage 270. In the second example 205, the server 105 received a change, which corresponds to the third change 145, at time (t+1) and another change, which corresponds to a fourth change 275, at time (t+3) that were received after the server-computed hash 255 was sent. The current state of the server-side webpage 120 at time (t+4) includes these changes, e.g., the third change 145 and the fourth change 275, as well.

In some embodiments, the server 105 may not have received any changes subsequent to sending the server-computed hash 255, in which case the current state of the server-side webpage 120 is a function the server-side webpage 120 in its initial state and changes corresponding to a set of diffs transmitted to the client 110 made to the server-side webpage 120. For example, if the third change 145 and the fourth change 275 were not made to the server-side webpage 120, then the current state of the server-side webpage 120, at time(t+4), is determined as a function of the initial state of the server-side webpage 120 and changes corresponding to the first diff 135 and the second diff 140 made to the server-side webpage 120.

Figure 3:
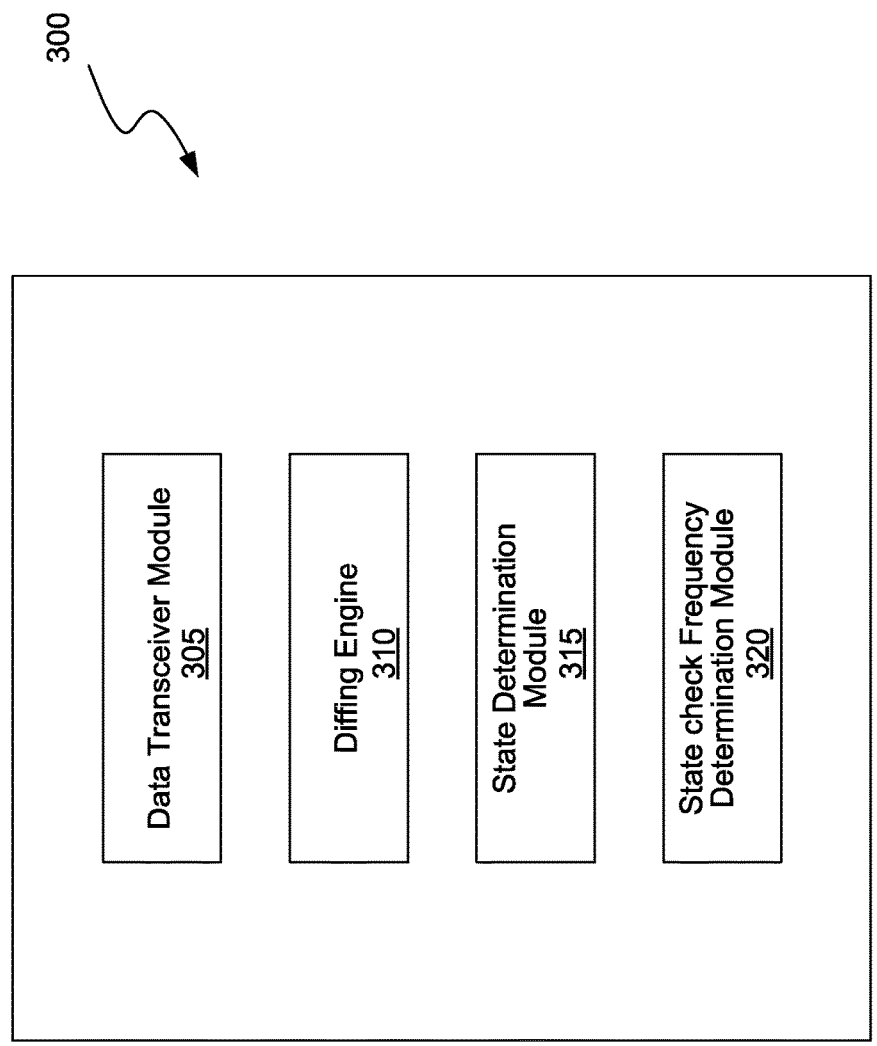
FIG. 3 is a block diagram of a system that can be used to implement the disclosed embodiments, consistent with various embodiments.

FIG. 3 is a block diagram of a system that can be used to implement the disclosed embodiments, consistent with various embodiments. In some embodiments, the system 300 can be implemented in the environment 100 of FIG. 1. The system 300 can be implemented in the server 105, in the client 110, as a stand-alone computer, or as a distributed system in which various components of the system 300 is distributed over various entities in the environment 100. In some embodiments, a specified component of the system 300 can be implemented in more than one entity in the environment 100. In some embodiments, different portions on a specified component of the system 300 can be implemented in different entities in the environment 100.

The system 300 includes a data transceiver module 305 to send and receive data. For example, the data transceiver module 305 can send a server-side webpage to the client 110, send diffs to the client 110, receive acknowledgements or status match indications from the client 110, receive updates to the server-side webpage from one or more sources, or send or receive webpage state information. The data transceiver module 305 can send the diffs using various communication protocols. In some embodiments, the data transceiver module 305 can send the diffs using a hyper-text transfer protocol (HTTP). Further, the data transceiver module 305 can send a diff in either a body or a header of a HTTP communication.

The system 300 includes a diffing engine 310 that is used to generate a diff, e.g., the first diff 135. The diffing engine 310 can use known diffing methods to compute a difference between an existing web page and an updated webpage that is generated by updating the existing webpage based on a change. The diffing engine 310 facilitates determining the diff. In some embodiments a portion of the diffing engine 310 can also execute at the client 110 and can facilitate applying the diff to a webpage displayed at the client 110.

The system 300 includes a state determination module 315 that determines a state of a webpage, e.g., the server-side webpage 120 and/or the client-side webpage 125. In some embodiments, the state determination module 315 represents the state as a hash value. The state determination module 315 can use known hashing methods to compute the hash value. However, the state information can be represented using various other fingerprints, or other techniques.

The system 300 includes a state check frequency determination module 320 that determines a frequency at which the states of the webpages, e.g., the server-side webpage 120 and/or the client-side webpage 125, have to be checked. Based on the determined frequency, the server 105 computes the hash value of the server-side webpage 120 and sends it to the client 110 to compare it with the state of the client-side webpage 125. The state check frequency determination module 320 can determine the frequency as a function of at least one of a specified schedule, availability of network bandwidth between the server 105 and the client 110, or an error rate at the client 110. In some embodiments, the frequency can be determined as an arbitrary value. For example, the server 105 can send the hash value after a random number of diffs, at random intervals.

Figure 4:
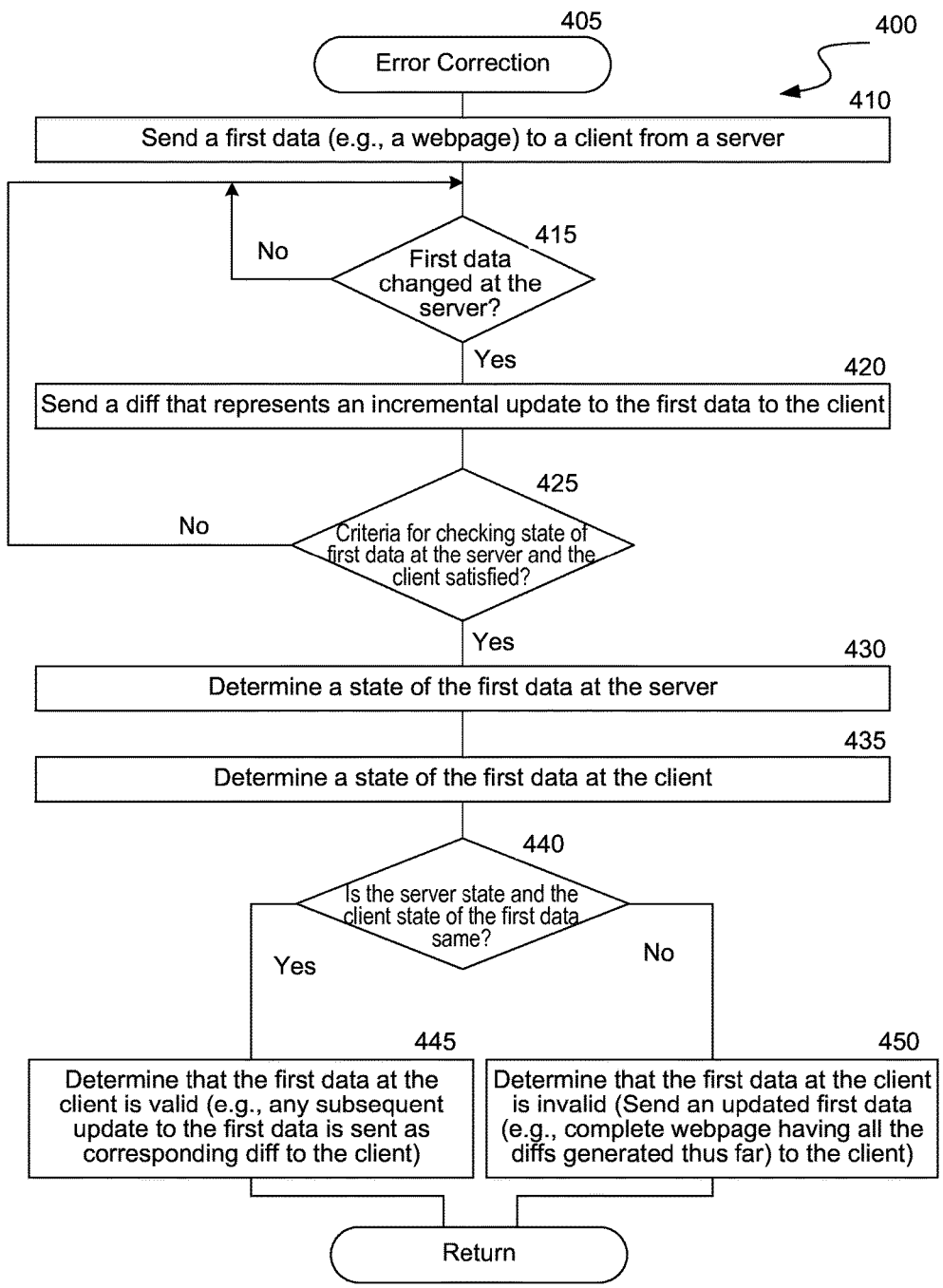
FIG. 4 is a flow diagram of a process of correcting errors in transmitting diffs, consistent with various embodiments.

FIG. 4 is a flow diagram of a process 400 of correcting errors in transmitting diffs, consistent with various embodiments. In some embodiments, the process 400 may be implemented in the environment 100 of FIG. 1 and using the system 300 of FIG. 3. The process 400 begins at block 405, and at block 410, a data transceiver module of the system 300, sends a first data, e.g., a server-side webpage 120 from a server to a client, e.g., from the server 105 to the client 110. The client 110 can render it as the client-side webpage 125. In some embodiments, when the server 105 is sending the server-side webpage 120 to the client 110 for the first time, the server-side webpage 120 is said to be in initial state. In some embodiments, the server-side webpage 120 can be generated by a social networking application executing at the server 105. The server-side webpage 120 can include comments posted by a number of users of the social networking application.

At determination block 415, the diffing engine 310 determines if the server-side webpage 120 has changed from its previous state. In some embodiments, the server-side webpage 120 changes when the server 105 receives a change to the server-side webpage 120 from one or more sources.

If the server-side webpage 120 has not changed, the process 400 continues to monitor the server-side webpage 120, e.g., to detect any changes to the server-side webpage 120. If the server-side webpage 120 has changed, at block 420, the diffing engine 310 generates a diff, e.g., the first diff 135, that represents an incremental change to the server-side webpage 120, e.g., change over the server-side webpage's 120 previous state. The data transceiver module 305 sends the diff to the client 110. The client 110 upon receiving the diff from the server 105 can apply it to the client-side webpage 125.

At determination block 425, the state check frequency determination module 320 determines if one or more criteria for checking the state of the webpages has been satisfied. The one or more criteria can include a frequency at which the states of the webpages are to be checked. In some embodiments, the frequency is determined as described at least with reference to FIGS. 2A, 2B and 3.

If the one or more criteria is not satisfied, the process 400 proceeds to determination block 415. If the one or more criteria is satisfied, at block 430, the state determination module 315 determines a state of the server-side webpage 120, e.g., as the server-computed hash 205. For example, consider that the criteria is satisfied after the first diff 135 and the second diff 140 is transmitted, as illustrated in FIG. 2.

At block 435, the state determination module 315 determines a state of the client-side webpage 125, e.g., as the client-computed hash 210.

One of the client-computed hash 210 or the server-computed hash 205 is computed first depending on which device is performing the comparison. For example, if the client 110 (e.g., state determination module 315 at the client 110) is performing the comparison, the server-computed hash 205 is computed first and the server 105 sends it to the client 110. The client 110 computes the client-computed hash 210 upon receipt of the server-computed hash 205. On the other hand, if the server 105 (e.g., state determination module 315 at the server 105) is performing the comparison, the client-computed hash 210 is computed first and the client 110 computes sends it to the server 105. The server 105 computes the server-computed hash 205 upon receipt of the client-computed hash 210.

At determination block 440, the state determination module 315 compares the states of the server-side webpage 120 and the client-side webpage 125 to determine whether or not they are the same.

If the states are the same, at block 445, the state determination module 315 determines that the client-side webpage 125 is valid, e.g., it is the same as the server-side webpage 120. Consequently, the server 105 may not have to send the complete server-side webpage 120 to the client 110. Any subsequent changes to the server-side webpage 120 can be sent as corresponding diffs to the client 110. For example, a change to the server-side webpage 120 corresponding to the third diff 145 can be sent as the third diff 145, as illustrated in FIG. 2A.

Referring back to the determination block 440, if the states of the server-side webpage 120 and the client-side webpage 125 are not the same, the state determination module 315 determines that the client-side webpage 125 is invalid. The client-side webpage 125 may be invalid for various reasons, e.g., one or more diffs sent by the server 105 may have been lost in transmission. The data transceiver module 305 can send the complete server-side webpage 270 to the client 110, as illustrated in FIG. 2B. The complete server-side webpage 270 is the server-side webpage 120 in its current state, e.g., the state at which the server-side webpage 120 exists at the time the complete server-side webpage 270 is being transmitted to the client computer. That is, complete server-side webpage 270 is the server-side webpage 120 including all the changes received up until the complete server-side webpage 270 is being transmitted to the client computer. As illustrated in FIG. 2B, the current state of the server side webpage 120 at (t+4), the instance at which the complete server-side webpage 270 is transmitted, includes all the changes made to the server-side webpage 120 until the time (t+4). In some embodiments, the complete server-side webpage 270 is determined as a function of a server-side webpage 120 in the initial state and the diffs that are sent to the client 110 up until the state comparison result is determined.

Figure 5:
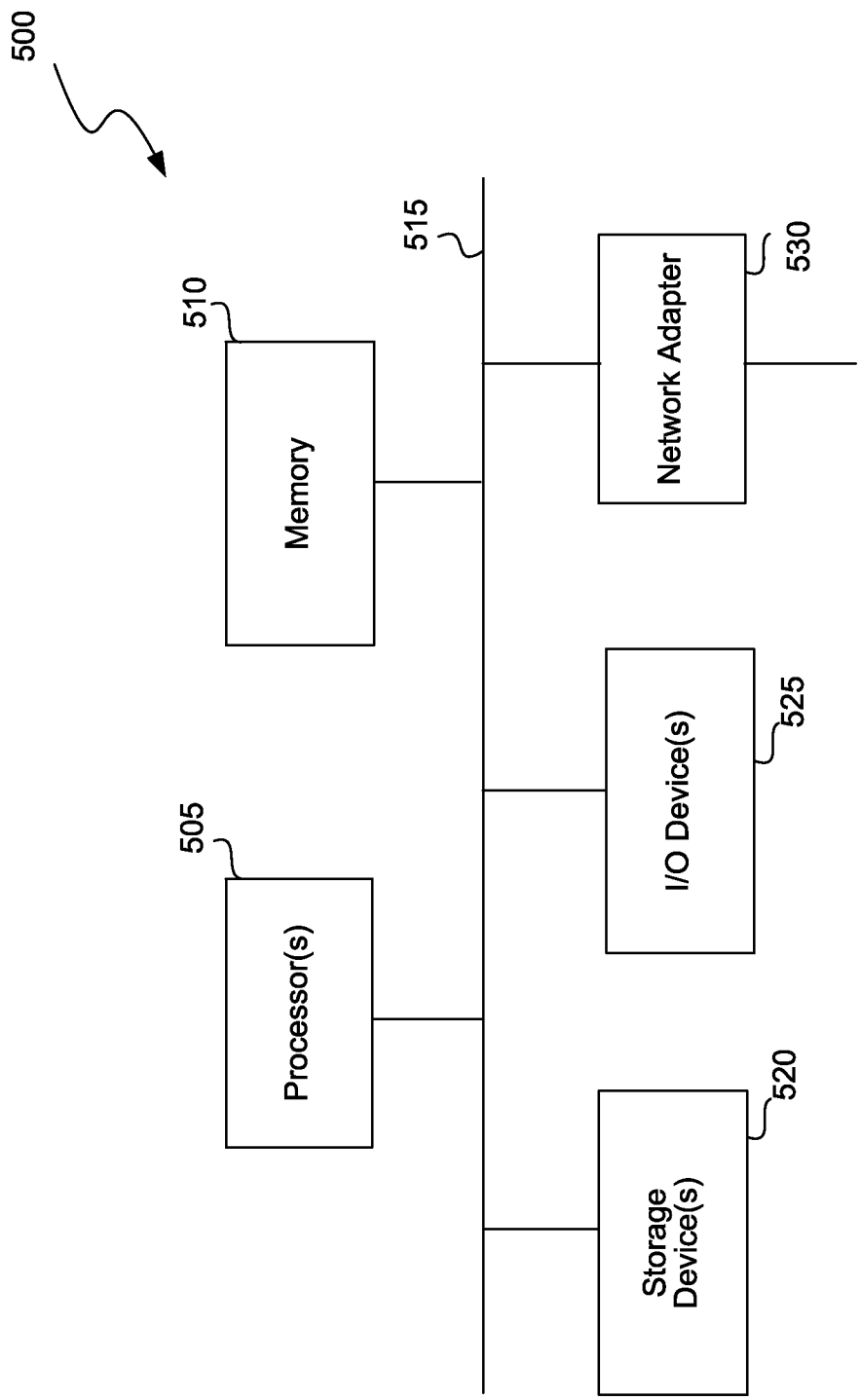
FIG. 5 is a block diagram of a processing system that can implement operations of the present invention.

FIG. 5 is a block diagram of a computer system as may be used to implement features of the disclosed embodiments. The computing system 500 may be used to implement any of the entities, components or services depicted in the examples of the foregoing figures (and any other components and/or modules described in this specification). The computing system 500 may include one or more central processing units ("processors") 505, memory 510, input/output devices 525 (e.g., keyboard and pointing devices, display devices), storage devices 520 (e.g., disk drives), and network adapters 530 (e.g., network interfaces) that are connected to an interconnect 515. The interconnect 515 is illustrated as an abstraction that represents any one or more separate physical buses, point to point connections, or both connected by appropriate bridges, adapters, or controllers. The interconnect 515, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 510 and storage devices 520 are computer-readable storage media that may store instructions that implement at least portions of the described embodiments.

In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 510 can be implemented as software and/or firmware to program the processor(s) 505 to carry out actions described above. In some embodiments, such software or firmware may be initially provided to the processing system 500 by downloading it from a remote system through the computing system 500 (e.g., via network adapter 530).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. A method performed by a computing system, comprising:

sending, by a server computer to a client computer, a first data and multiple changes to the first data at the server computer, the multiple changes including a sequence of diffs, wherein each diff of the sequence is an incremental change in a server state of the first data over a previous diff in the sequence, the server state indicating a state of the first data at the server computer;

computing, by the server computer after a first specified diff of the sequence is transmitted to the client computer but prior to transmitting a second specified diff of the sequence, a server-computed hash value based on the server state, the second specified diff corresponding to an incremental change in the server state of the first data over an incremental change to which the first specified diff corresponds;

sending, by the server computer, the server-computed hash value to the client computer;

receiving, at the server computer from the client computer, an indication of whether the server state of the first data matches a client state of the first data based on a comparison made at the client computer between the server-computed hash value and a client-computed hash value computed by the client computer based on the client state at the client computer, the client state being a state of the first data at the client computer; and sending, by the server computer, one of an updated first data or the second specified diff to the client computer based on the received indication, the updated first data determined as a function of the first data and changes corresponding to the first specified diff and the second specified diff made to the first data, wherein sending one of the updated first data or the second specified diff includes:

determining that there is an error in the first data at the client computer in an event the server state does not match the client state, wherein the error is caused due to a loss of a diff at the client computer, and sending the updated first data to the client computer in response to the error.

2. The method of claim 1, wherein sending one of the updated first data or the second specified diff includes sending the second specified diff to the client computer in an event the server state matches the client state.

3. The method of claim 1, wherein receiving the indication from the client computer of whether the server state matches the client state includes receiving an indication from the client computer that the server state does not match the client state.

4. The method of claim 1, further comprising sending, by the server computer, server-computed hash values to the client computer at a specified frequency.

5. The method of claim 4, wherein sending the server-computed hash values at the specified frequency includes determining the specified frequency based on at least one of a specified schedule, a specified number of diffs sent to the client computer, an availability of network bandwidth, or an error rate at the client computer.

6. The method of claim 5, wherein the error rate is determined as a function of a rate of loss of diffs at the client computer.

7. The method of claim 1, wherein the indication of whether the server state matches the client state is determined by causing the client computer to compute the client-computed hash value as a function of a state of the first data at the client computer after applying a set of diffs to the first data.

8. The method of claim 1, wherein sending the first data to the client computer includes sending a web page to the client computer.

9. The method of claim 1, wherein sending the first data to the client computer includes sending a set of messages to the client computer, the set of messages being messages exchanged at least between two users of a messaging application.

10. A non-transitory computer-readable storage medium storing computer-readable instructions, the instructions comprising:
   instructions for sending, by a server computer to a client computer, a web page;
   instructions for sending changes to the web page as a sequence of diffs to the client computer, the sequence of diffs including:
      a first diff representing a first incremental change in a server-computed state of the web page, the server-computed state being a state of the web page at the server computer, and
      a second diff representing a second incremental change in the server-computed state of the web page over the first incremental change;
   instructions for computing, by the server computer after the server computer transmits the first diff but before the server computer transmits the second diff, a server-computed hash value based on the server-computed state of the web page;
   instructions for sending, by the server computer, the server-computed hash value to the client computer;
   instructions for receiving, at the server computer from the client computer, an indication of whether the server-computed state of the web page matches a client-computed state of the web page based on a comparison made at the client computer between the server-computed hash value and a client-computed hash value computed by the client computer based on the client-computed state of the web page at the client computer after the client computer has applied the first diff to the web page at the client computer but before the server computer transmits the second diff; and
   instructions for transmitting, by the server computer, an updated web page to the client computer in an event that the client-computed state does not match the server-computed state, wherein the state does not match due to an error in the web page at the client computer, wherein the error is caused due to a loss of a diff at the client computer, the updated web page determined as a function of the web page and changes corresponding to the first diff and the second diff made to the web page.

11. The non-transitory computer-readable storage medium of claim 10, wherein the instructions for transmitting the updated web page to the client computer include:
   instructions for transmitting the second diff to the client computer in an event the client-computed state matches the server-computed state.

12. The non-transitory computer-readable storage medium of claim 10, wherein the instructions for receiving the indication of whether the server-computed state matches the client-computed state include:
   instructions for causing the client computer to send the indication of whether the server-computed state matches the client-computed state at a specified frequency, the specified frequency based on at least one of a specified schedule, a specified number of diffs sent to the client computer, an availability of network bandwidth, an availability of computing resources at the client computer, or an error rate at the client computer.

13. The non-transitory computer-readable storage medium of claim 10, wherein the instructions for receiving the indication of whether the server-computed state matches the client-computed state include:
   instructions for causing the client computer to compute the client-computed hash value as a function of a state of the web page at the client computer after applying a set of diffs to the web page at the client computer.

14. A system, comprising:
   a processor;
   a first module configured to send from a server computer to a client computer a first data and multiple changes to the first data, the multiple changes including a sequence of diffs, the sequence of diffs including a second diff representing a second incremental change in the sequence made to the first data at the server computer over a first diff that is transmitted prior to the second diff in the sequence, the first diff corresponding to a first incremental change in the sequence made to the first data; and
   a second module configured to compute, by the server computer after the server computer transmits the first diff but before the server computer transmits the second diff, a server-computed hash value based on a server-computed state of the first data at the server computer, wherein the first module is further configured to:
   send, by the server computer, the server-computed hash value to the client computer;
   a receive, at the server computer from the client computer, an indication of whether the server-computed state of the first data matches a client-computed state of the first data based on a comparison made at the client computer between the server-computed hash value and a client-computed hash value computed by the client computer based on the client-computed state of the first data at the client computer before the first module transmits the second diff; and
   transmit, by the server computer, an updated first data to the client computer in an event the client-computed state does not match the server-computed state, wherein the state does not match due to an error in the web page at the client computer, wherein the error is caused due to a loss of a diff at the client computer, the updated first data determined as a function of the first data and changes corresponding to the first diff and the second diff made to the first data.

15. The system of claim 14 further comprising:
a third module that is configured to determine a frequency at which server-computed hash values are sent to the client computer, or send instructions to the client computer regarding a frequency at which the client computer is to transmit indications of whether the server-computed state matches the client-computed state to the server computer.

* * * * *